April 25, 1939.  E. BRAND  2,155,752
LIGHT MOUNT
Filed Aug. 18, 1937  3 Sheets-Sheet 1
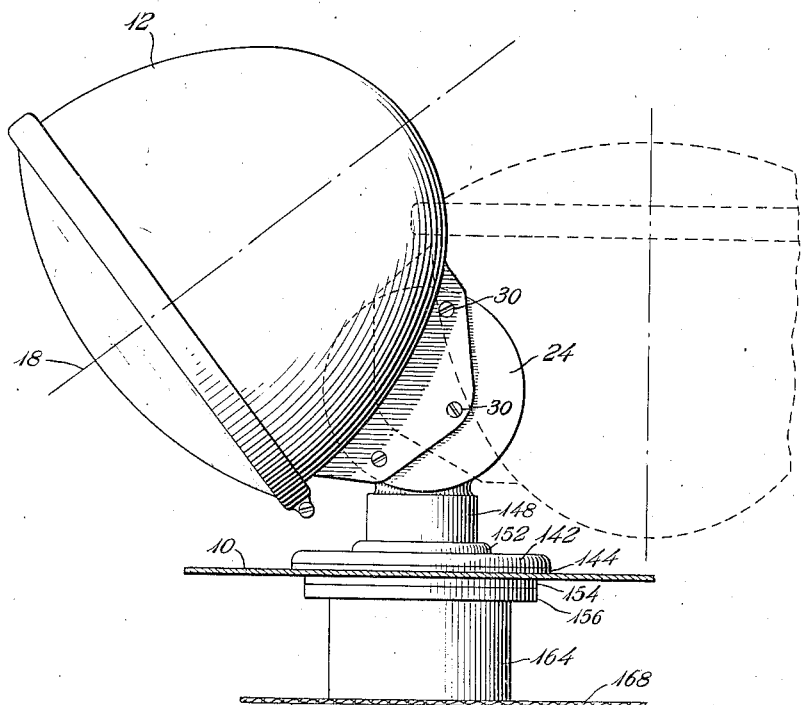
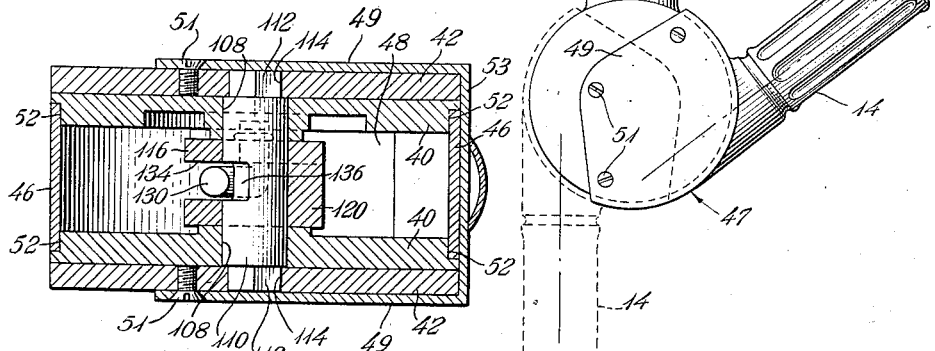
Erick Brand.
INVENTOR
BY Victor J. Evans & Co.
HIS ATTORNEYS

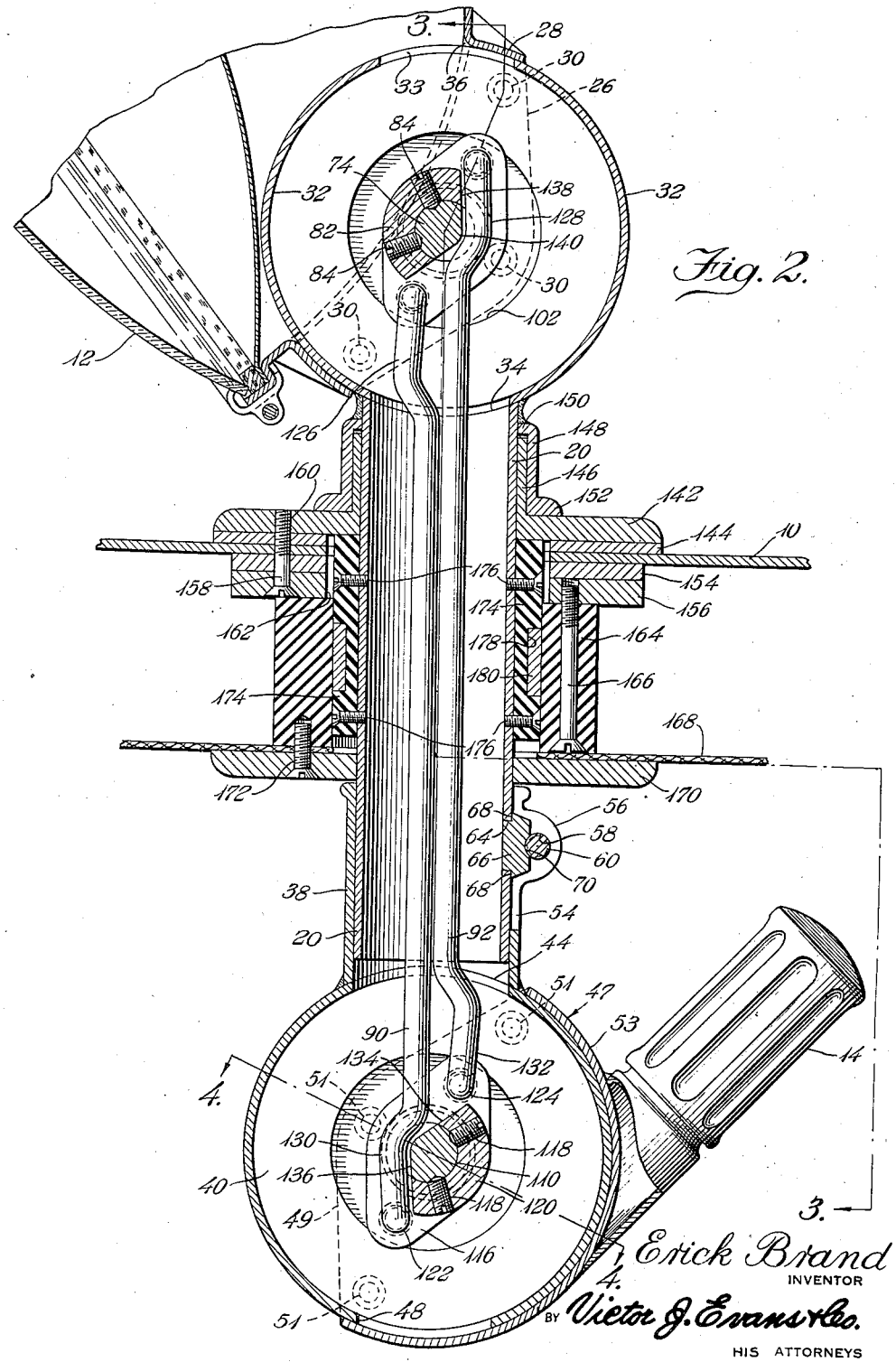

April 25, 1939.  E. BRAND  2,155,752
LIGHT MOUNT
Filed Aug. 18, 1937   3 Sheets-Sheet 3

Erick Brand
INVENTOR
BY Victor J. Evans & Co.
HIS ATTORNEYS

Patented Apr. 25, 1939

2,155,752

UNITED STATES PATENT OFFICE 2,155,752

LIGHT MOUNT

Erick Brand, Elkhart, Ind.

Application August 18, 1937, Serial No. 159,763

2 Claims. (Cl. 240—61.13)

My invention relates to illumination, and includes among its objects and advantages the provision of an improved light mount.

An object of my invention is to provide a mount for spot or flood lights embodying novel means for adjusting the light in a vertical plane or rotating the light in either direction in a horizontal plane or in various planes at different angles to the horizontal.

Another object is to provide a light mount including control means for the light so constructed and arranged as to permit the light to be simultaneously adjusted in vertical and horizontal planes and in which novel means are incorporated for indicating the direction of the light beam in all positions of the light even though the light is hidden from the view of the operator.

Another object is to provide a light mount particularly adapted for location on automobile and truck tops, boat decks, and other elevated structures lying in horizontal planes or at angles to the horizontal.

Another object is to provide a light mount in which the light may be rotated any number of turns in either direction and in which novel means are employed for maintaining a closed circuit regardless of the position of the light.

In the accompanying drawings:

Fig. 1 is an elevational view of my light mount;

Fig. 2 is a sectional view;

Fig. 4 is a sectional view along the line 4—4 of Fig. 2; and

Figure 3:
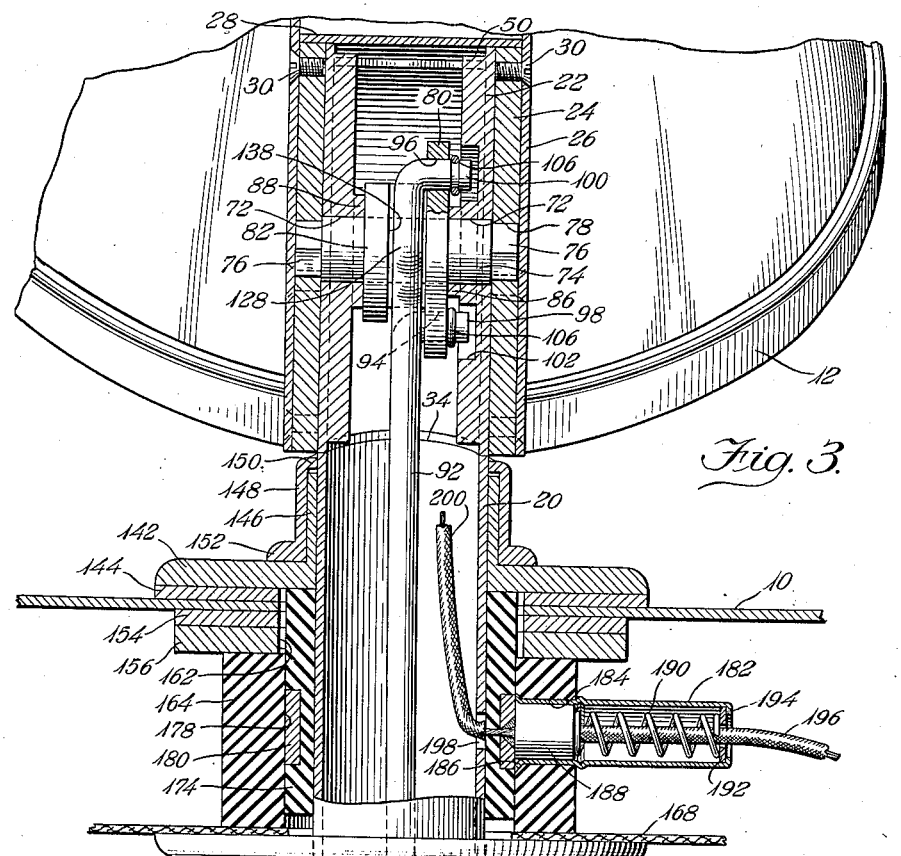
Fig. 3 is a sectional view along the line 3—3 of Fig. 2.

In the embodiment selected to illustrated my invention, I make use of a supporting structure 10 which may comprise the metallic shell of an automobile or truck top or other suitable structure. Upon the structure 10, I mount a light 12 of the spot or flood type, which light includes the usual lenses, bulb, reflector and the like. Since such lights are well known in the art, it need not be described in further detail.

Light 12 is operatively connected with a handle 14 for control purposes. The full line position of the light 12 in Fig. 1 illustrates its lowest angle of adjustment, but the light may be shifted in a vertical plane through the medium of the handle 14 to direct a beam vertically. The axis 16 of the handle 14 parallels the axis 18 of the light 12 in all positions, so that the angularity of the light beam may be determined by observing the position of the handle 14, assuming, of course, that the light is not visible from the operator's position. Light 12 is also mounted for rotation about a vertical axis. Rotation of the handle 14 about the vertical axis of the light mount rotates the light 12 in the same degree and since the axis 16 parallels the axis 18, angularity of the light beam in all positions of the light corresponds to the position of the handle 14.

Specifically, the light mount comprises a metallic tube 20 terminating in spaced and parallel plates 22. Upon the outer faces of the plates 22 I mount operating plates 24 which are fixedly connected with the light 12. Plates 22 and 24 are circular, as illustrated in Fig. 2, while the plates 24 are substantially enclosed between lips 26 formed integrally with or otherwise attached to the housing of the light 12. The upper ends of the lips 26 are interconnected by a reach 28 while the lips 26 are fixedly connected with the operating plates 24 by screws 30.

About the periphery of the plates 22 I mount closure plates 32 which are spaced at their upper ends to provide an opening 33 to lend access to the space between the plates 22. Plates 22 and closure plates 32 may be welded to the tube 20 along the line 34 (see Fig. 2). The housing of the light 12 is cut out at 36 to provide an opening for accommodating plates 22 and 24 as well as the wiring for the light. Plates 22, 24, and closure plates 32 may be defined as a head for connection with the light 12.

Upon the lower end of the tube 20 I mount a companion tube 38 which carries plates 40 corresponding to the plates 22 and actuating plates 42 of the same construction as plates 24. Plates 40 may be welded to the tube 38 along the line indicated generally at 44. Closure plates 46 are connected with the plates 40 and their upper ends are welded to the tube 38 in the same manner as the plates 40. The lower ends of closure plates 46 are spaced to provide an opening 48 permitting access to the space between the plates 40. Spaced plates 40 and the closure plates 46 together with the plates 42 define a head which serves as a mounting for the handle 14.

The inner end of the handle 14 is fixedly connected with a cap 47 which includes flanges 49 fixedly connected with the plates 42 by screws 51. Cap 47 includes a curved reach 53 which has close fitting relation with the plates 46 and rotates thereabout. In all positions of the handle 14 the curved reach 53 covers the opening 48. Similarly, the opening 33 is covered by the light 12 and the lip 28 to provide a moisture seal.

Closure plates 32 have their marginal edges lying within grooves 50 in the plates 22 and may be welded to the plates. Similarly, closure plates 46 have their marginal edges lying within grooves 52 in the plates 40 and may be welded to the plates. The upper and lower heads are identical in construction with the exception that the lower head is slightly larger in diameter since the tube 38 lies outside the tube 20.

Tube 38 is slotted at 54 inwardly of its upper end, and two lugs 56 are welded to the tube 38 adjacent the slot 54. The lugs are bored at 58 for the reception of a screw 60 having threaded relation with one of the lugs, as indicated at 62. A narrow slot 64 is cut in the tube 20 for the reception of a key 66 which fits between the lugs 58. Key 66 is provided with shoulders 68 which abut the outer face of the tube 20, and the key is held in the position illustrated in Fig. 2 by the screw 60. The key is recessed slightly at 70 to partly embrace the screw 60, which relation holds the key in position. Tube 38 may be drawn tightly about the tube 20 by merely tightening the screw 60, but the key 66 provides a positive connection so that the two tubes will be connected as a unit.

In Figs. 2 and 3, the plates 22 are bored at 72 for rotatably supporting a shaft 74 having square ends 76 lying within similarly shaped openings 78 in the plates 24. Ends 76 terminate flush with the outer faces of the plates 24 while the ends fit snugly within the openings 78 so as to impart rotary motion of the plates when the shaft 74 is turned. Upon the shaft 74 I mount a lever 80 having a hub 82 bored to receive the shaft 74, and the hub is fixedly connected with the shaft by set screws 84.

One face of the lever 80 lies in abutting relation with the boss 86 on one of the plates 22, while the end of the hub 82 lies in abutting relation with the hub 88 on the other plate 22. Two connecting rods 90 and 92 are connected at their upper ends with the lever 80. The lever is provided with bores 94 and 96 for the reception of right-angular reaches 98 and 100 formed at the upper ends of the connecting rods 90 and 92, respectively.

Referring to Fig. 2, it will be noted that the bores 94 and 96 are positioned at equal distances from the axis of the shaft 74 as well as being located at diametrically opposite points with respect to the shaft. I groove one of the plates 22 at 102 for accommodating the reaches 98 and 100, which groove is located in concentric relation with the axis of the shaft 74. Reaches 98 and 100 may be grooved for the reception of conventional spring locking collars 106.

Lever 80 is positioned in close relation with one of the plates 22 to bring the connecting rods 90 and 92 centrally of the tube 20. In Fig. 4, I illustrate plates 40 as being bored at 108 for rotatably receiving a shaft 110 having square ends 112 fitting snugly within similarly shaped openings 114 in the plates 42. Fig. 2 illustrates a lever 116 as being mounted on the shaft 110 and keyed thereto by set screws 118. Lever 116 is of the same construction and size as the lever 80 and includes a similar hub 120.

The lower ends of the connecting rods 90 and 92 are provided with right-angular reaches 122 and 124, respectively, which correspond to the reaches 98 and 100 and are connected with the lever 116 in the same manner. Connecting rod 90 is offset at 126 and 130 while connecting rod 92 is offset at 128 and 132.

In Fig. 4, I illustrate the hub 120 as being recessed at 134, while the shaft 110 is also recessed at 136. With the parts adjusted according to Fig. 2, the offset 130 lies within the recesses 134 and 136. Fig. 1 illustrates the extreme upper position of the handle 14, at which time the light 12 is positioned in its extreme lower position. When the handle 14 is rotated to its extreme opposite position, as indicated in dotted lines in Fig. 1, the offset 132 will lie within the recesses 134 and 136.

Hub 82 associated with the lever 80 is provided with a recess 138 of the same shape and arrangement as the recess 134, while the shaft 74 is provided with a recess 140 of the same size and shape as the recess 136. Recesses 138 and 140 accommodate the offsets 126 and 128 in the same manner as the recesses 134 and 136 accommodate the offsets 130 and 132.

In Fig. 2, a supporting plate 142 is mounted on the support 10 with a sealing gasket 144 positioned between the plate and the support to render the connection moisture-proof. Plate 142 includes a tubular extension 146 which loosely embraces the tube 20, and the extension 146 is enclosed within a rain shield 148 having an inturned flange 150 welded to the tube 20. Rain shield 148 includes a flange 152 which lies upon the plate 142. The rain shield constitutes a downward thrust bearing for the light and its associated parts.

Adjacent the lower side of the support 10, I position a sealing gasket 154 against which I position a plate 156. Screws 158 pass through aligned openings in the plate 156, the sealing gasket 154, the support 10, the sealing gasket 144, and have threaded relation at 160 with the plate 142. Thus, all the parts are tied into a unitary structure by merely tightening the screws 158.

Plate 156 is provided with a large central opening 162. Adjacent the lower face of the plate 156, I position a collar 164 of insulating material, which collar is fixedly secured to the plate 156 by screws 166. In an automobile installation, the cloth ceiling material is indicated at 168, which material is pinched between the lower end of the collar 164 and the plate 170 anchored to the collar by screws 172.

Upon the tube 20 and within the collar 164 I mount a collar 174 of insulating material. Collar 174 is securely fastened to the tube 20 by screws 176. I groove the collar 174 at 178 for the reception of an electric pickup ring 180 which may be shrunk in place within the groove. Collar 164 carries a tube 182 having one end lying within a bore 184 in the collar 164, which tube is held in connected relation with the collar by reason of a spun flange 186. A contact brush 188 is loosely positioned within the tube 182 and is urged into pressure relation with the electric pickup ring 180 by a compression spring 190 having one end abutting the contact brush and its opposite end abutting a washer 192 retained within the tube 182 by bending the material of the tube to provide a flange 194. An electric cable 196 is connected with the brush 188 and extends through the spring 190. Cable 196 may be connected with a source of current.

Tube 20 is provided with an opening 198 for accommodating the cable 200 which is electrically connected with the lamp in the light 12. Cable 200 is electrically connected with the ring 180. Tube 20 is rotatably positioned within the tubular extension 146. Collar 180 rotates with the tube. Since the collar 180 extends completely about the collar 174, the electrical connection between the cables 196 and 200 is maintained in all positions of the light 12.

Figure 5:
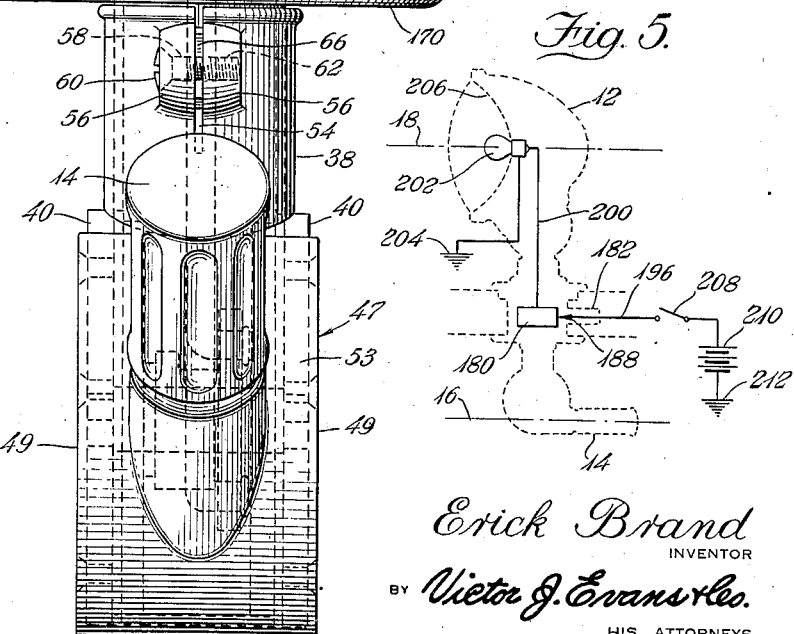
Fig. 5 is a diagrammatic view of a circuit which may be employed in my invention.

In Fig. 5, I illustrate the circuit which may be associated with the light 12. The electric lamp 202 is electrically connected with the cable 200, and the lamp is grounded at 204. The lamp reflector is indicated at 206. Cable 196 may be provided with a switch 208, and the cable may be connected with a source of current 210 grounded at 212.

From the foregoing description of the various parts of the device, the operation thereof will be readily understood. Levers 80 and 116 are identical in construction while the connecting rods 90 and 92 are of equal length. Movement of the handle 14 rotates the lever 116, which, in turn, rotates the lever 80 in the same degree. Since the lever 80 is fixedly connected with the shaft 74, rotation of the lever will transmit rotary motion to the operating plates 24 which are fixedly connected with the light 12. Since the lever 80 always shifts in the same degree as the lever 116, the axis 16 of the handle is maintained in parallel relation with the axis 18 of the light in all positions. Axis 16 of the handle corresponds to the axis of the light beam reflected by the light 12, which permits the operator to determine the direction of projection of the light beam by observing the position of the handle 14. Thus, the direction of the light beam with respect to elevation and lateral rotation in either direction corresponds to the position of the handle 14.

The entire device is effectively sealed from the ingress of moisture. Tube 20 may be rotated easily within the tubular extension 146 while the rain shield 148 rotates easily about the tubular extension but provides a moisture seal about the tube 20 and the upper end of the extension 146. Vertical displacement of the tube 20 is restrained because of the supporting plate 142 and the plate 156. Gaskets 144 and 154 provide an effective moisture seal with respect to the support 10. Collar 164 and the plate 170 provide convenient anchorage for the cloth ceiling material 168.

Without further elaboration, the foregoing will so fully explain my invention that others may, by applying current knowledge, readily adapt the same for use under various conditions of service.

I claim:

1. A device of the type described comprising a support having an opening, a tube extending through said opening and rotatably mounted on said support, spaced plates carried by one end of the tube and having openings, a shaft rotatably mounted in said openings, operating plates lying adjacent said plates and fixedly connected with said shaft, a light fixedly connected with said operating plates, a lever fixedly connected with said shaft, a companion tube fixedly connected with said first tube, spaced plates carried by said companion tube and having openings, a shaft rotatably mounted in said last-named openings, operating plates lying adjacent said last-named plates and fixedly connected with said last-named shaft, a handle fixedly connected with said last-named plates, a lever fixedly connected with each shaft, means operatively connecting said levers, and an electrical conductor for connection with said lamp, said electrical conductor including means rotatable with said first tube for connection with an outside source of current in all positions of the lamp.

2. The combination with a light and a supporting structure, of a pair of hollow heads and a tubular connection between the heads rotatably mounted on the supporting structure, said light being rotatably mounted on one of said heads, a handle rotatably mounted on the other of said heads, a lever operatively connected with said light and located inside the head associated therewith, a lever operatively connected with said handle and located inside the head associated therewith, and a pair of links pivotally connected with the levers, said links being located centrally of the tubular connection and being offset intermediate their ends to provide portions co-extensive in length with the hollow connection and lying in juxtaposed relation in two extreme positions of the light.

ERICK BRAND.